Dec. 20, 1966     H. D. KAISER ET AL     3,293,077
MICROELECTRONIC CAPACITOR MATERIAL AND METHOD OF FABRICATION
Filed June 29, 1964     2 Sheets-Sheet 1

INVENTORS
HAROLD D. KAISER
ARTHUR H. MONES

BY

ATTORNEY

United States Patent Office 3,293,077
Patented Dec. 20, 1966

3,293,077
MICROELECTRONIC CAPACITOR MATERIAL AND METHOD OF FABRICATION
Harold D. Kaiser and Arthur H. Mones, Poughkeepsie, N.Y., assignors to International Business Machines Corporation, New York, N.Y., a corporation of New York
Filed June 29, 1964, Ser. No. 378,863
3 Claims. (Cl. 117—217)

This invention relates to an improved capacitance device for microelectronic circuitry and more particularly to an improved dielectric composition and a method of making such composition for employment in a capacitance device.

Capacitors for microelectronic circuits are required to be of sufficiently small size as to be compatible with the size of the particular microelectronic modules that contain the circuits in which such capacitors are employed. The dimensions of such a capacitor are usually of the order of a few tenths of an inch with a thickness of the order of approximately one mil. A standard process by which a capacitance device is fabricated is the well known silk screening technique by which a first electrode material is deposited on a substrate, a dielectric material is deposited on the first electrode and a second electrode material is deposited on the dielectric material, after which the resultant structure is fired at a sufficiently high temperature to burn off the squeegee medium or organic vehicle that serves as a carrier for the respective granular particles that go to make up each of the respective electrodes and dielectric material. In order to provide such electrodes and dielectric material of a sufficiently controlled thickness and quality, each of the respective materials is ground into powdered form and mixed with an appropriate liquid vehicle prior to the screening process.

In order to completely burn off the organic vehicle, and also to achieve thorough sintering of the dielectric material, which sintering serves to bind the structure together, the above described structure is fired at a relatively high temperature, normally well in excess of 1000° C. Particular dielectric materials, the use of which is preferable in capacitance devices for microelectronic circuitry, include the ferroelectric materials such as barium titanate ($BaTiO_3$) and strontium titanate ($SrTiO_3$) as well as titanate systems formed of different percentages of barium titanate and strontium titanate. Barium titanate, for example, sinters in the range of 1300–1450° C. However, many metals the use of which is preferable as electrode material, such as gold and gold platinum mixtures, have a melting point below the above referred to temperature range. In order to accommodate the employment of such electrode materials, it is necessary to fire the respective capacitance devices at a temperature below the melting temperature of the electrode material which is usually slightly greater than 1000° C. However, firing at this lower temperature results in an incomplete sintering of the dielectric material accompanied by an increased porosity that lowers the effective dielectric constant of permittivity of the material, a decrease in mechanical strength and also an increase of the probability of pinholing effects that result in shorting out of the capacitor.

Another disadvantage of firing the above described silk screened layers of material at temperatures of the order of 1300° C. is that very special ceramic furnaces must be provided since the more common types of furnace employing metallic structures are damaged at such high temperatures, especially after prolonged use. Thus, from the standpoint of manufacturing a large quantity of capacitors for microelectronic circuitry, it is desirable to have a capacitor the structure and material of which can be readily fired at a relatively low temperature preferably below 1000° C.

It is, then, an object of the present invention to provide an improved capacitance device having a dielectric material that is relatively free of porosity and pinholing effects.

It is another object of the present invention to provide an improved capacitance device for microelectronic circuitry, that has a dielectric material, the reduction of porosity and pinholing effects of which are not readily dependent on the temperature at which the device is fired.

It is still another object of the present invention to provide a dielectric material for a microelectronic capacitance device that does not require firing at temperatures in excess of 1000° C. in order to minimize porosity and pinholing effects.

It is still a further object of the present invention to provide an improved method of fabricating a dielectric material for a microelectronic capacitance device which material is relatively free of porosity and pinholing effects.

As stated above, dielectric compositions for microelectronic capacitance devices normally are fabricated of powdered dielectric materials which are sintered together during the fabrication process by firing at relatively high temperatures which for most dielectric materials is well above 1000° C. The purpose of this sintering is to bind the powdered dielectric particles together and to the respective electrode films. If the dielectric particles are fired at a temperature below their sintering temperature range, there results a lack of such binding action with increased porosity in the dielectric material resulting in a decreased dielectric constant. Even where the dielectric particles are fired at a temperature in their sintering temperature range, such porosity can still result if the firing process is not continued for a sufficiently long period of time.

It has been discovered that the disadvantages inherent in a dielectric composition the porosity of which results from insufficient sintering can be overcome by suspending the respective dielectric particles in a glassy binder material that has a softening temperature well below the sintering temperature of the respective dielectric materials so as to provide the required fluxing and bonding action to bind the dielectric particles together and eliminate porosity even though the composition is not fired at temperatures in the sintering temperature range of the dielectric material. Such glassy binding materials may be selected from various oxides and silicates although it has been found that particular materials such as bismuth trioxide ($Bi_2O_3$), barium borosilicate glasses, and lead borosilicate glasses are preferable.

It will be appreciated that the respective glassy materials will have a dielectric constant considerably lower than that of the particular dielectric particles to be incorporated in the dielectric composition and that the dielectric constant of the composition will be lowered as the percentage of the glassy material is increased. On the other hand, the percentage of glassy material incorporated in the dielectric constant must be of a sufficient amount to fill the voids that would exist in the otherwise unsintered dielectric material. It has been discovered that for various powdered dielectric materials, the dielectric constant decreases due to porosity when the amount of the glassy binder material constitutes no more than 5 percent of the dielectric composition by volume. On the other hand, it has been observed that the dielectric constant of the composition is decreased when the amount of glassy binder material added thereto exceeds 15 percent of the total composition by volume with a maximum dielectric constant being obtained for approximately 10 to 12 percent by volume of the total composition being the glassy binder material.

A feature, then, of the present invention resides in a dielectric composition for a microelectronic capacitor which composition includes a mixture of a powdered dielectric material and a glass binder material such that during the fabrication process, the composition can be fired at a temperature below the sintering temperature of the dielectric material.

More specifically, the feature of the present invention resides in a dielectric composition including a mixture of a powdered dielectric material suspended in a glass binder material where the glass binder material constitutes at least 5 percent but no more than 15 percent of the composition by volume and preferably constitutes 10 to 12 percent of the composition by volume.

Still another feature of the present invention resides in a method of fabricating a dielectric composition, which method includes the steps of mixing a powdered dielectric material with a glass binder material and firing the composition at a temperature below the sintering temperature of the powdered dielectric material.

Other objects, advantages and features of the present invention will become more readily apparent from a review of the following specification when taken in conjunction with the drawings wherein.

Figure 1:
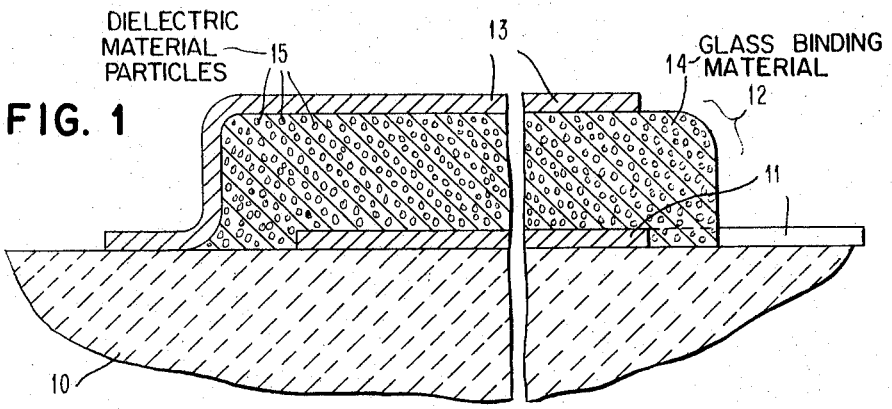
FIGURE 1 is a cross sectional view of a microelectronic capacitor employing a dielectric material of the present invention.

Referring briefly to FIGURE 1, there is shown therein a capacitance device for employment with a microelectronic module as contemplated in the present invention. First electrode 11 is deposited on the module substrate 10 and dielectric material 12 of the type employed in the present invention is deposited over electrode 11 after which second electrode 13 is deposited to complete the capacitor's structure. This structure is secured together by glass binding material 14 which makes up a small portion of dielectric material 12 by volume as will be more thoroughly described below, and throughout which dielectric material particles 15 are suspended as illustrated in FIGURE 1.

Figure 3:
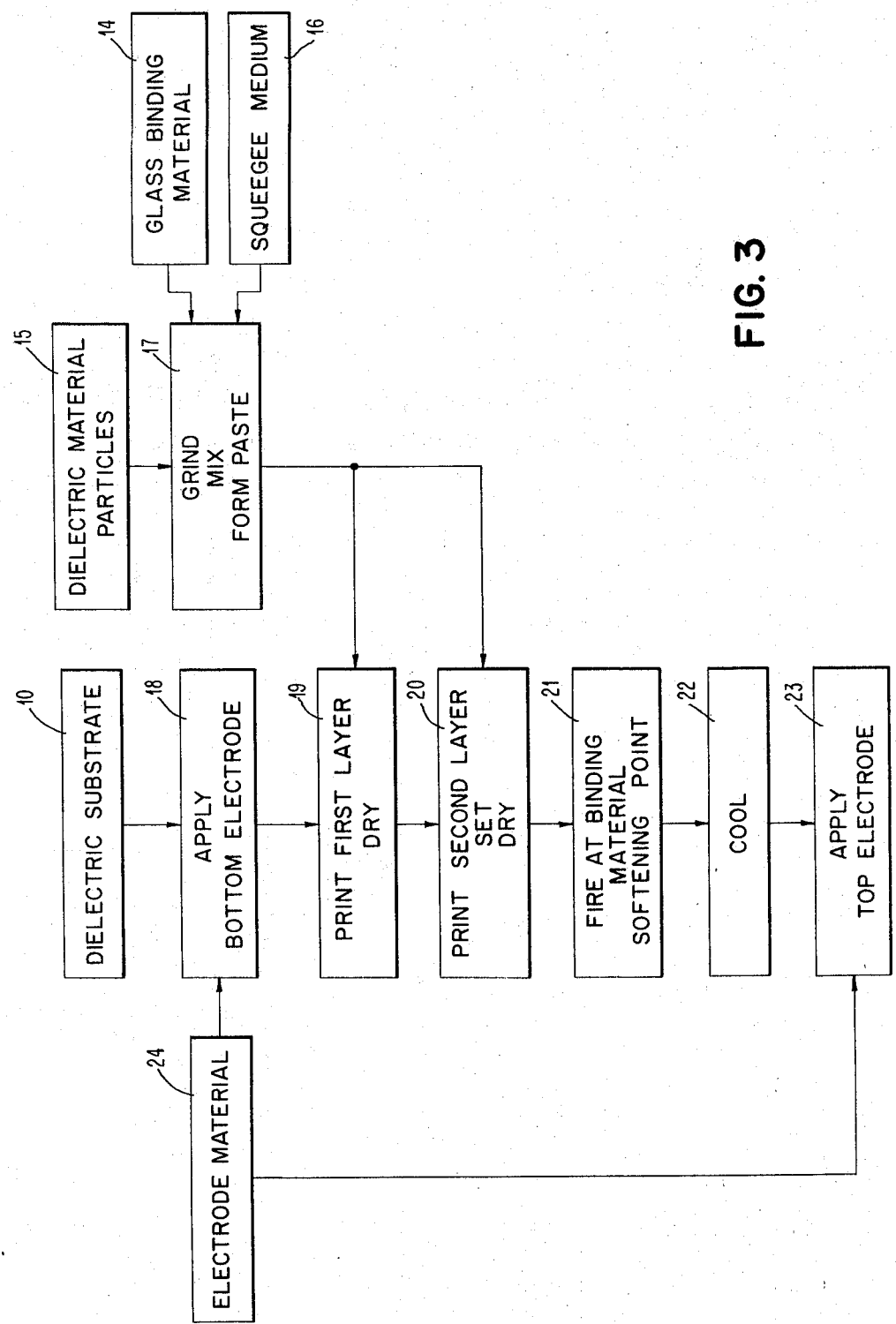
FIGURE 3 is a flow diagram of the materials used and of the operations performed in the novel method of fabricating a microelectronic capacitor of the present invention.

In order to more clearly describe the present invention, the respective steps of the method by which the dielectric material of this invention is fabricated will now be explained. First, the particular dielectric material 15, which may be a sintered mixture of a plurality of dielectric compounds, is ground in a mortar and pestle according to standard procedures for preparing such a material for a silk screening process. At the same time, an appropriate amount of the glass binding material 14 is added in powdered form to be mixed with the powdered dielectric material and the resultant mixture is then dispersed in an appropriate squeegee medium 16 in the ratio of approximately 30 percent of the squeegee medium to 70 percent of the glass-dielectric material by weight. This operation is shown as method step 17 in the flow diagram of FIGURE 3.

To prepare a thin film capacitor of the type employed on a microelectronic module, the bottom electrode such as first electrode 11 in FIGURE 1 is screened and fired onto module substrate 10 using standard procedures (step 18). In order to create the dielectric material structure, a first layer of the above described mixture is screened onto the bottom electrode and is then dried at 150° C. for approximately 15 minutes (step 19), after which a second layer of dielectric mixture as described above is screened onto the first layer and the resultant composition is allowed to set for approximately one-half hour and then further dried at 150° C. for approximately 15 minutes (step 20). The structure thus far obtained is then placed on an alumina firing plate and fired at a temperature in the range of 800° to 1000° C. for approximately one hour (step 21), after which the structure is removed from the furnace and cooled rapidly by a suitable method (step 22). The second or top electrode is then screened onto the dielectric material and fired according to standard electrode techniques (step 23). When it is desired to achieve a capacitance device employing a plurality of electrodes and dielectric material layers, the above procedures can be repeated as often as necessary.

The particular electrode materials 24 employed are not critical to the present invention and may be of any standard conductive material employed in microelectronic capacitors, such as platinum, and other precious metals or combinations of such metals. Furthermore, the present invention may employ any type of dielectric material 15 commonly employed in microelectronic capacitors. For example, if the resultant capacitor is to have a small capacitance value (e.g., below 500 pf.), titanium oxide ($TiO_2$) may be employed. If a higher capacitance is desired, then the dielectric material may be selected from the group of ferroelectric materials noted for their high dielectric constants such as barium titanate ($BaTiO_3$), or its various modifications such as barium-strontium titanate systems.

Various glassy binder materials may be employed such as lead borosilicate and barium borosilicate glasses, bismuth trioxide and other glasses of high electrical quality.

Figure 2:
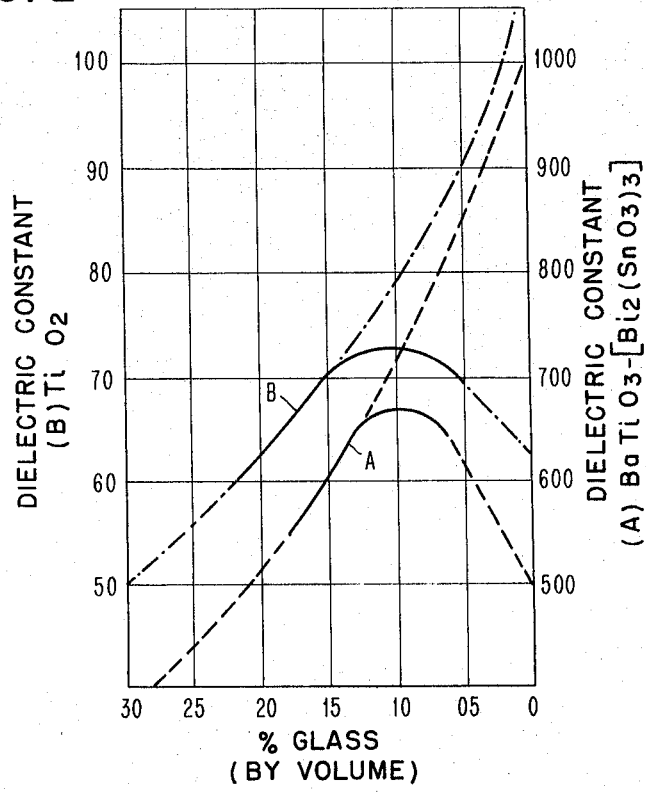
FIGURE 2 is a graph representing a plot of permittivity versus the percentage of glass binder material employed in particular dielectric compositions of the present invention.

To illustrate the effect of variation of the percentage of the glass binder material employed in the dielectric composition of the present invention, reference is now made to FIGURE 2 which includes a series of curves representing permittivity versus percentage of the dielectric materials titanium oxide and a barium titanate-bismuth stannate system where each curve represents a composition that has been fired at 1000° C. for one hour.

In FIGURE 2, the solid curves A and B represent measurable dielectric constants for particular dielectric materials 15 of the present invention, the values of which begin to noticeably decrease as the percentage of the glass binding material is reduced below approximately 5 percent by volume. Specifically, curve A represents the dielectric constant or permittivity of powdered particles of a barium titanate-bismuth stannate system [$BaTiO_3$-$Bi_2(SnO_3)_3$], which particles are suspended throughout a binding material of bismuth trioxide, and curve B represents the dielectric constant or permittivity for powdered particles of titanium dioxide ($TiO_2$) suspended throughout a barium borosilicate glass. The broken curves which accompany the respective solid curves A and B are calculated according to the equation $$K_e = \pi_i K_i{}^{v_i}, \quad \sum_i v_i = 1$$

where $K_e$ is the effective dielectric constant of the composite material and each $K_i$ represents the dielectric constant of a respective material from the plurality of which materials the composite is formed, each material constituting a percentage volume represented by a respective $v_i$. This equation is merely another way of stating the so-called log mixing rule or Lichtenecker's rule (see A. von Hippel, Dielectrics and Waves, John Wiley and Sons, 1954, page 231).

The upwardly extending portions of the broken curves above solid curves A and B represent values of the respective composite dielectric constants that would be expected if porosity were not encountered (e.g. where the respective composite materials are fired at a temperature in the neighborhood of 1350° C.). It will be observed from the solid curves A and B that porosity appears to begin to occur when the percentage of glass is less than approximately 15 percent by volume.

In calculating the values of the broken curves, it has been assumed that the dielectric constant for thoroughly sintered titanium dioxide is approximately 110 and the dielectric constant for the thoroughly sintered barium titanate-bismuth stannate material is approximately 1000, which values may vary depending upon the firing temperatures and time duration of firing, and in the case of the latter material upon the percentage of barium titanate. Such calculations also assume a dielectric constant for barium borosilicate glass to be approximately 7 and a dielectric constant for polycrystalline bismuth trioxide to be approximately 40.

In addition to the pronounced decrease of the dielectric constant due to porosity when the percentage of glass is less than approximately 5 percent by volume, the measurable values of the composite dielectric material begin to deviate from that which might be expected from the above equation when the percentage of the glass is increased above 25 percent by volume. Such deviations are believed to be caused by a reaction between the respective glass binder material and the particular dielectric material such that there does not exist completely separate identifiable materials within the composition, a requirement for the above equation to be reasonably accurate.

Although it appears from the curves of FIGURE 2, that porosity begins to occur when the percentage of the glass binder material is reduced below 15 percent, optimum measurable dielectric constants are obtained for approximately 10 to 12 percent by volume of the glass binder material. Furthermore, since the deviation of the measurable composite dielectric constant from calculated values is primarily due to the occurrence of porosity as the percentage of the glass binder material is decreased, the above-stated optimum percentages can be expected to be relatively independent of the particular powdered dielectric material and glass binder employed to form the composite material.

By employing a glass binder material that has a softening temperature in the range of 800° C. to 900° C., it is possible to achieve a dielectric structure that need not have been fired at a temperature in the sintering range of the particular dielectric material since thorough binding action is achieved by heating the structure to a temperature above the softening point of the glass binder. Thus, the employment of the structure of the present invention allows one to use various electrode materials that have a melting temperature below the sintering range of the particular dielectric particles.

While the present invention has been particularly shown and described with reference to the preferred embodiments of specific compositions, it will be understood by those skilled in the art that changes and modifications in form and details may be made without departing from the spirit and scope of the present invention.

What is claimed is:

1. A method of fabricating a dielectric composition which includes the steps of:

mixing a high permittivity dielectric material together with a glass binder material to form a resultant mixture thereof, said binder material comprising 5-15%, by volume, of said mixture;

dispersing said resultant mixture in a carrier vehicle to form a paste, the ratio of resultant mixture to vehicle being approximately 70-30%, by weight; and firing said paste above the softening point of said glass binder material but below the sintering temperature of said dielectric material for binding said materials together and forming a nonporous dielectric composition.

2. A method of forming a microelectronic capacitor device on a dielectric substrate which includes the steps of:

depositing a first electrode material on the substrate and forming a first capacitor electrode;

mixing a high permittivity dielectric material together with a glass binder material to form a resultant mixture thereof, said binder material comprising 5-15%, by volume, of said mixture;

dispersing said resultant mixture in a carrier vehicle to form a paste, the ratio of resultant mixture to vehicle being approximately 70-30%, by weight;

printing said paste on said first capacitor electrode;

firing said paste on said first capacitor electrode at a temperature above the softening point of said glass binder material but below the melting point of said first electrode material for binding said materials together and forming a non-porous dielectric composition, said dielectric material having a sintering temperature above and said binder material having a softening point below, the melting point of said first electrode material; and depositing a second electrode material on said dielectric material and forming a second capacitor electrode.

3. The method, according to claim 2, wherein the amount of glass binder material mixed with said high permittivity dielectric material comprises 10-12%, by volume, of said resultant mixture.

References Cited by the Examiner

UNITED STATES PATENTS

| | | | |
|---|---|---|---|
| 1,912,772 | 6/1933 | Higgins | 65—18 X |
| 2,220,775 | 11/1940 | Narias | 65—18 X |
| 2,398,176 | 4/1946 | Degrup. | |
| 2,460,356 | 2/1949 | Kreidl | 65—18 X |
| 2,693,629 | 11/1954 | Denes. | |
| 2,759,854 | 8/1956 | Kilby | 317—261 X |
| 2,956,219 | 10/1960 | Cianchi | 317—258 |
| 3,195,030 | 7/1965 | Herczog | 317—258 |

LEWIS H. MYERS, *Primary Examiner.*

E. A. GOLDBERG, *Assistant Examiner.*